United States Patent Office 3,517,723
Patented June 30, 1970

3,517,723
VEHICLE TIRE FITTING AND REMOVAL APPARATUS
Derek Hogg, Sutton Coldfield, and William G. Leeson, Tamworth, England, assignors to The Dunlop Company Limited, London, England, a British company
Filed Feb. 5, 1968, Ser. No. 702,949
Claims priority, application Great Britain, Feb. 23, 1967, 8,666/67
Int. Cl. B60c 25/08
U.S. Cl. 157—1.24       10 Claims

ABSTRACT OF THE DISCLOSURE

A combination tire fitting and removal head adapted for use with known apparatus comprising a flat, elongated plate having a fitting element extending from one surface, a guide element extending from the other surface and located opposite the fitting element and a removal element on said other surface spaced away from the removal element. The fitting element may be in the form of a curved plate and in use engages with the radially inner surface of a tire bead to force it radially outwardly over the wheel rim and into the well. The guide element in the form of a hooked member engages the wheel rim and locates the head with respect to the wheel. The removal element in the form of a wedge also engages with the wheel rim and in use removes the tire bead from out of the wheel well over the rim after the initial use of a tire lever.

---

This invention relates to vehicle tire fitting and removal apparatus and particularly relates to a tire fitting and removal head adapted to be used with known apparatus comprising gripping means for releasably securing a wheel in position upon the apparatus in a stationary or rotatable manner while a tire fitting or removal operation is carried out, such known apparatus hereinafter being referred to as being "of the type specified."

It is an object of the invention to provide a new or improved vehicle tire fitting and removal head for use with such apparatus of the type specified.

In accordance with the invention there is provided a combination vehicle tire fitting and removal head engageable with a wheel for mounting upon an apparatus of the type specified comprising an elongated member having, extending from one surface thereof, a fitting element for engagement with the radially-inner surface of a tire bead during the fitting of a tire upon the wheel, a guide element extending from an opposed surface of the elongated member and located in a position opposed to said fitting element for engagement with the radially-outer surface of the wheel rim during both the fitting and removal of a tire to a wheel and a removal element spaced away from said guide element for engagement with the radially-outer surface of the wheel rim and also with the bead of a tire during the removal thereof from the wheel.

The fitting element is preferably provided with a convex surface and the head is locatable relative to the wheel in such a manner that the axis of curvature of said convex surface is parallel to the wheel axis, that said surface is engageable with the radially-inner surface of a tire bead and that said surface is locatable to extend from a position radially-inwardly of the rim flange external periphery to a position substantially radially coincident with or slightly radially-outwardly of said periphery. The fitting element may be in the form of a curved plate.

Preferably the guide element comprises a hooked member. The removal element may comprise a rounded approximately wedge-shaped member the base of which is coincident with the surface of the elongated member from which it extends but it may further comprise a protuberance located on the side of the elongated member opposite the wedge-shaped member and having lateral dimensions of the same order as those of said wedge-shaped member.

The said elongated member preferably comprises a flat substantially crescent-shaped plate and may be provided with an aperture therein for rotatably mounting said member about an axis substantially parallel to and spaced-apart from the wheel axis so as to locate the head with the guide and removal elements thereof in engagement with the radially-outer surface of the wheel rim for relative operative movement between the head and the wheel and tire.

The head may be adapted for use in conjunction with known apparatus in which the head is rotatable about the periphery of a fixed wheel e.g. the head may be mounted upon a shaft which may be radially movable along a support shaft rotatably secured to a spindle which is itself secured to the apparatus coaxial with the wheel axis. Alternatively the head may be fixed and the wheel rotatable e.g. the shaft may be mounted upon a support shaft rotatable about an axis parallel to but remote from the wheel axis, the head then being locatable in position in engagement with the wheel and the wheel being rotatable relative to the head.

One embodiment of the tire fitting and removal head constructed in accordanec with the invention will now be described in more detail and its use in conjunction with two alternative forms of tire fitting and removal apparatus of the type specified will also be described by way of example. Reference will be made to the accompanying drawings of which:

Figure 4:
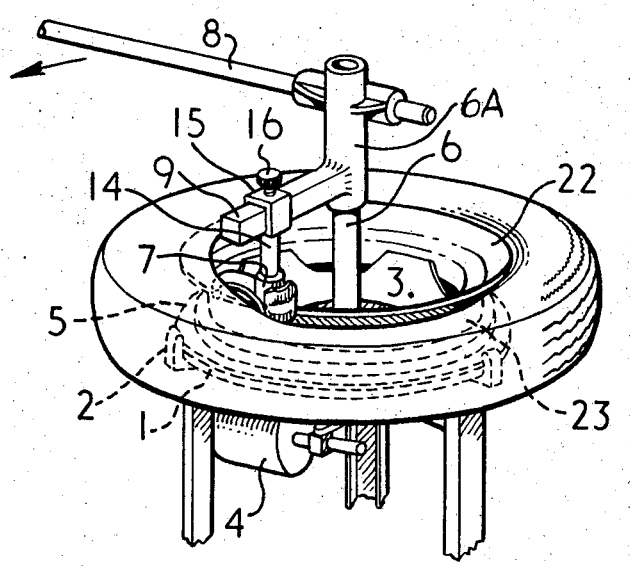
FIG. 4 is a part perspective view of the head in use upon a first alternative apparatus showing a tire being removed from a wheel.

As shown in FIG. 4 the first alternative tire fitting and removal apparatus in conjunction with which the head is to be utilised is generally disclosed in U.S. Pat. No. 2,764,-194 and comprises a horizontally-disposed platform 1 having a set of wheel gripping jaws 2 located around the periphery thereof. The wheel 3 is locatable upon the upper surface of the platform with the wheel axis substantially vertical, and the jaws are movable radially-inwardly and outwardly of the platform under the influence of pneumatically-operated means 4 to grip the lower wheel flange 5 thereby to clamp the wheel in position upon the apparatus. Secured to the platform and extending vertically upwardly therefrom there is a cylindrical shaft 6 coaxial with the wheel axis and a wheel fitting and removal head 7 in accordance with the invention is mountable upon and rotatable about this shaft in a manner to be described.

The shaft 6 has a tubular housing 6A placed over it, and this housing is provided with an elongated operating lever 8 at its upper end which extends normal to its longitudinal axis and is also provided with a further integral support shaft 9 of substantially square transverse cross-sectional form extending radially-outwardly therefrom. In accordance with the invention the present tire fitting and removal head 7 is mounted upon said support shaft 9 and is adjustably movable along said shaft dependent upon the diameter of the wheel from or to which, respectively, the tire is to be removed or fitted.

Figure 1:
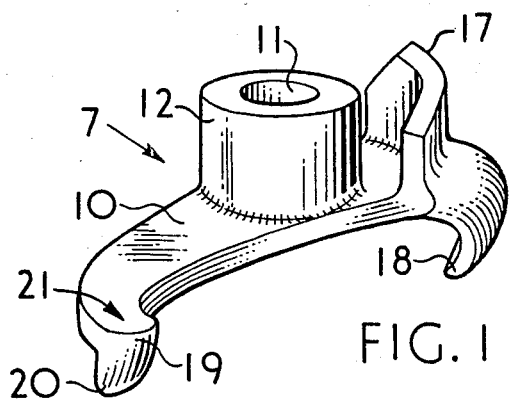
FIG. 1 is a perspective view of the head constructed according to the invention.
Figure 2:
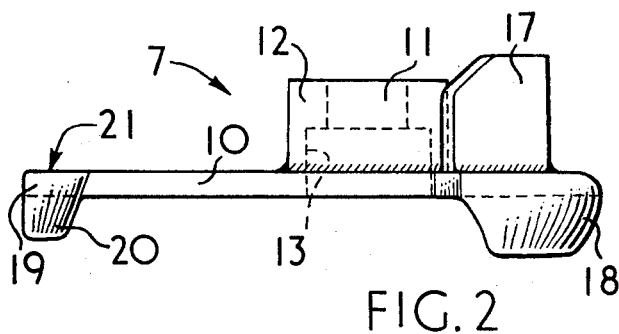
FIG. 2 is a side view of the head shown in FIG. 1.
Figure 3:
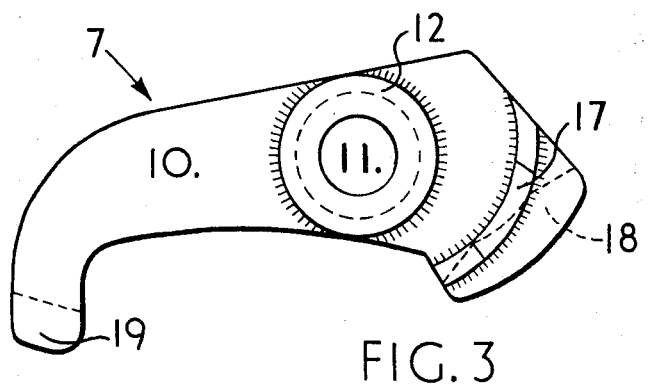
FIG. 3 is a plan view of the head shown in FIGS. 1 and 2.

Referring now to the head itself as is best shown in FIGS. 1 to 3 the tire fitting and removal head 7 comprises a flat, substantially crescent-shaped plate 10 having an aperture 11 formed therein and a bushing 12 coaxially secured to the plate about the aperture and extending upwardly therefrom. The bushing is of a stepped internal diameter, the larger diameter portion 13 (FIG. 2) of which is adjacent to the upper surface of the plate whereby the plate may be rotatably mounted upon a vertically-disposed shaft 14 (FIG. 4) as will be described herein. Said shaft upon which the plate is mounted is of circular transverse cross-sectional form and is formed at its upper end with an integral open square frame 15 of internal dimensions slightly greater than the cross-sectional dimensions of the aforesaid support shaft 9 so that it is slidable along said shaft and may be selectively located in a position along the shaft by means of a set screw 16 passing through the uppermost member of the frame and engaging the upper surface of said support shaft.

The lower end of the cylindrical shaft is formed as a spigot (not shown) of stepped diameter to engage within the stepped bushing of the crescent-shaped plate, a collar (not shown) being secured to the lowermost end of the spigot within the larger diameter portion of the bushing by means of a grub screw (not shown) whereby axial movement of the plate relative to the shaft is prevented but free rotary movement is allowed.

At one end of the crescent-shaped plate 10 there is provided a curved tire fitting element 17 in the form of a curved plate extending upwardly from the outer surface of the crescent-shaped plate, the axis of the circle of curvature of this curved plate being substantially parallel to the axis of the cylindrical shaft and thus also being substantially parallel to the wheel axis. As will be further described herein the head is locatable relative to the wheel so that the curved fitting plate 17 extends from a position radially inwardly of the wheel flange periphery to a position slightly radially outwardly thereof, the radially inwardly located end of said plate being the leading end of the head for the purposes of fitting a tire to the wheel.

Opposed to this curved plate and extending downwardly from the lower surface of the crescent-shaped plate is a guide element 18 of curved hook form for engagement with the radially outer surface of a wheel rim in a manner to be described herein.

At the other end 19 of the crescent-shaped plate remote from the curved plate and guide element there is provided a removal element 20 extending downwardly from the lower surface of the crescent-shaped plate, the removal element being of rounded, approximately wedge-shaped form the base of which is coincident with the lower surface of the crescent-shaped plate 10.

In operation, during the fitting of a tire to a wheel already clamped in position upon the apparatus, the tire fitting and removal head 7 is first of all radially adjusted relative to the wheel along the support shaft 9 so that both the guide and removal elements (18 and 20 respectively) abut against the radially outer surface of the uppermost rim flange 22 of the wheel. The tire is then placed upon the wheel so that the lower bead is partly over the rim whereupon a part of this bead will be brought into contact with the aforesaid upwardly extending curved plate. Rotation of the removal and fitting head by means of the operating lever will cause the curved plate to move around the radially inner surface of the tire bead thereby causing the lower bead to pass over the rim and into the well 23 of the wheel. The upper bead of the tire is then placed partly over the upper wheel rim and the operation is repeated to mount the tire upon the wheel. In the fitting of both beads, the movement of each bead into the well is assisted by the lower extremities of the wedge-shaped removal element which prevents the bead from moving back out of the well after it has been pressed over the rim by the curved plate.

Alternatively both the upper and lower beads of the tire may be placed partly over the wheel rim and the removal and fitting head operated upon both beads in the manner described above to fit both beads together over the wheel rim and into the well.

To remove the tire from a wheel clamped in position upon the apparatus the removal and fitting head is located relative to the upper rim as described above and a tire lever or similar device is placed under the upper bead to lift it on to the upper surface 21 of the crescent-shaped plate directly above the removal elements 20. Rotation of the head about the wheel then causes the removal element to lift the whole of the bead out of the wheel well onto the upper surface of the crescent-shaped plate. The lower bead of the tire, and therefore the whole tire, is removed from the wheel in a similar manner.

Figure 5:
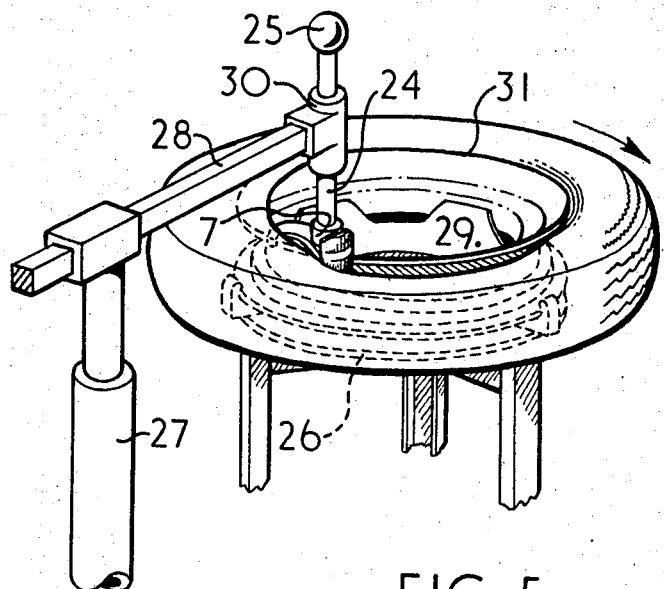
FIG. 5 is a part perspective view of the head in use upon a second alternative apparatus showing a tire being removed from a wheel.
Figure 6:
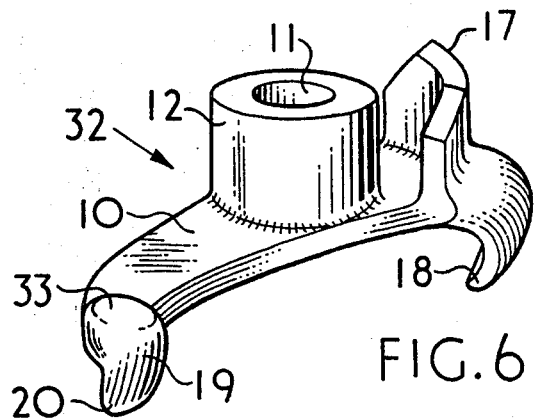
FIG. 6 is a perspective view of a modified form of the head constructed according to the invention.
Figure 7:
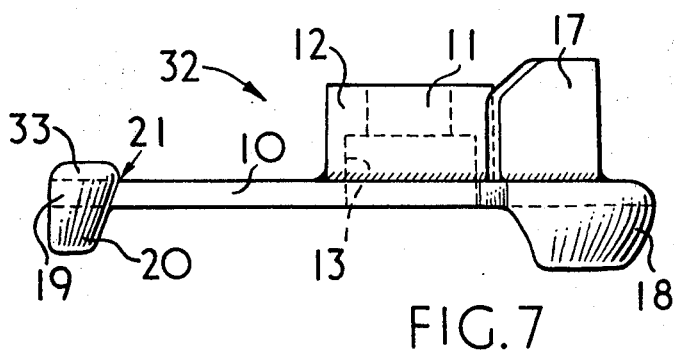
FIG. 7 is a side view of the head shown in FIG. 6.
Figure 8:
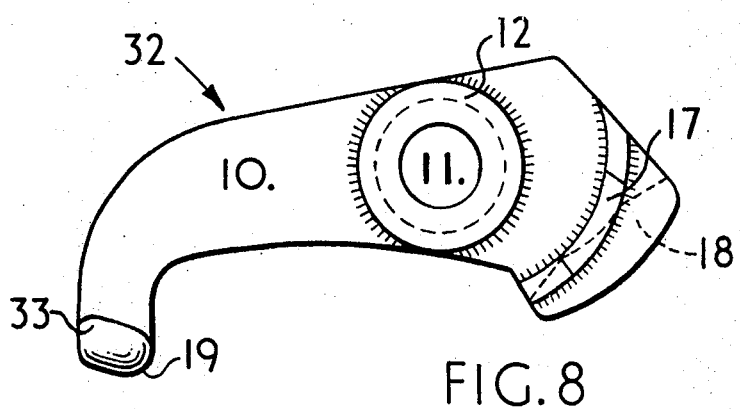
FIG. 8 is a plan view of the head shown in FIGS. 6 and 7.

In FIG. 5 the construction of the tire fitting and removal head 7 is the same as that hereinbefore described but in this instance it is being used with the second alternative tire fitting and removal apparatus. The head is rotatably secured upon the lower end of a cylindrical shaft 24 in the same manner as described in the first embodiment but the uppermost end of the shaft is formed with an integral enlargement 25 of spheroidal form in place of the square frame, the purpose of such enlargement being further described below. In this alternative type of fitting and removal apparatus, which is also known, the wheel is again clamped in position upon the apparatus upon a suitable chuck 26 whereby the wheel is rotatable upon the apparatus by means of an electric motor. In this type of apparatus no integral centre shaft is provided for mounting a tire fitting and removal head since such operations are carried out from the side of the apparatus with the head stationary.

With such an apparatus a vertical shaft 27 is provided at the side thereof and a support shaft 28 of rectangular transverse cross-section extends radially therefrom so as to be rotatable about the vertical shaft towards and away from a wheel 29 mounted upon the apparatus. That end of the support shaft remote from the aforesaid vertical shaft is formed with an integral cylindrical bushing 30 of circular internal transverse cross-section with the longitudinal axis of the bushing being substantially vertical. The internal diameter of the bushing is such that the cylindrical shaft 24 carrying the tire fitting and removal head 7 is a free sliding fit therein while the aforesaid spherical enlargement 25 upon the cylindrical shaft retain said shaft captive within the bushing.

The tire fitting and removal head may thus be brought into engagement with the upper wheel rim 31 by movement of the support shaft about the vertical shaft, different wheel widths being accommodated by provision of the sliding engagement of the cylindrical shaft carrying the head within the bushing on the support shaft. The positioning of the head relative to the wheel is thus the same as described with respect to the above first embodiment and tire fitting and removal operations are carried out in similar manner with the exception that it is the wheel which is rotated relative to the head by means of the aforesaid electric motor while the head itself remains stationary.

In a modified construction 32 of the embodiment the upper surface 21 of the head i.e. opposite the wedge-shaped member 20, is provided with a rounded hump-like protruberance 33 having lateral dimensions of the same order as those of the wedge-shaped member. To remove a tire from a wheel part of the bead is lifted over this protruberance by means of a tire lever to be retained there and thus prevented from slipping off the head and back into the wheel during the subsequent part of the removal operation.

Having now described our invention, what we claim is:

1. A combination vehicle tire fitting and removal head for use with a device which holds the tire wheel in place during a tire changing operation comprising:
   (a) an elongated member having a fitting element and a guide element at one end thereof and a removal element at the other end thereof.
   (b) means to rotatably support said elongated member located between said ends;
   (c) said fitting element having a surface for engagement with the radial inner surface of a tire bead during the fitting of a tire upon a wheel;
   (d) said guide element extending in a direction opposite to that of said fitting element and having means for engagement with the radial outer surface of a wheel rim during both the fitting and removal of a tire to a wheel;
   (e) said removal element extending in the same direction as said guide element and having a surface for engagement with the radial outer surface of the wheel rim and also with the bead of a tire during the removal thereof from the wheel.

2. A combination tire fitting and removal head according to claim 1 wherein the fitting element is provided with a convex surface, and the head is locatable relative to the wheel in such a manner that the axis of curvature of said convex surface is parallel to the wheel axis, that said surface is engageable with the radially-inner surface of a tire bead and that said surface is locatable to extend from a position radially-inwardly of the rim flange external periphery to a position substantially radially coincident with said periphery.

3. A combination tire fitting and removal head according to claim 2 with the modification that the head is locatable relative to the wheel in such a manner that the said convex surface is locatable to extend from a position radially-inwardly of the rim flange external periphery to a position slightly radially outwardly of said periphery.

4. A combination tire fitting and removal head according to claim 1 wherein the fitting element is in the form of a curved plate.

5. A combination tire fitting and removal head according to claim 1 wherein the guide element means for engagement comprises a hooked member.

6. A combination tire fitting and removal head according to claim 1 wherein the removal element comprises a rounded approximately wedge-shaped member, the base of which is coincident with the surface of the elongated member from which it extends.

7. A combination tire fitting and removal head according to claim 6 wherein the removal element comprises a protuberance located on the side of the elongated member opposite the wedge-shaped member for retention of part of the tire bead during removal of the tire from the wheel.

8. A combination tire fitting and removal head according to claim 7 wherein the protuberance has lateral dimensions of the same order as those of said approximately wedge-shaped member.

9. A combination tire fitting and removal head according to claim 1 wherein said elongated member comprises a flat, substantially crescent-shaped plate.

10. A combination tire fitting and removal head according to claim 1 wherein said means to rotatably support is an aperture for rotatably mounting said member about an axis substantially parallel to and spaced apart from the wheel axis so as to locate the head with the guide and removal elements thereof in engagement with radial outer surface of the wheel rim for relative operative movement between the head and the wheel and tire.

References Cited

UNITED STATES PATENTS

| | | | |
|---|---|---|---|
| 2,655,985 | 10/1953 | Henderson | 157—1.24 |
| 2,974,722 | 3/1961 | Twiford | 157—1.22 |
| 3,050,110 | 8/1962 | Lydle | 157—1.24 |
| 3,100,011 | 8/1963 | Lydle | 157—1.22 |
| 3,247,883 | 4/1966 | Strang et al. | 157—1.22 |

GRANVILLE Y. CUSTER, Jr., Primary Examiner